(12) United States Patent
Zerban et al.

(10) Patent No.: US 10,471,375 B1
(45) Date of Patent: Nov. 12, 2019

(54) ELECTRONIC WATER FILTER ASSEMBLY WITH FAUCET CONNECTORS AND DISSIMILAR, UPSTREAM FRUSTO-CONICAL, DOWNSTREAM TUBULAR-SHAPED, MEDIA

(71) Applicant: Tern Water, Inc, Wilmington, DE (US)

(72) Inventors: Mohamed Zerban, Philadelphia, PA (US); Connor White, Philadelphia, PA (US)

(73) Assignee: Tern Water, Inc., Philadelphia, PA (US)

(*) Notice: Subject to any disclaimer, the term of this patent is extended or adjusted under 35 U.S.C. 154(b) by 0 days.

(21) Appl. No.: 15/396,694

(22) Filed: Jan. 2, 2017

Related U.S. Application Data

(60) Provisional application No. 62/273,476, filed on Dec. 31, 2015.

(51) Int. Cl.
| | | |
|---|---|---|
| *B01D 35/00* | (2006.01) |
| *B01D 35/143* | (2006.01) |
| *C02F 1/28* | (2006.01) |
| *C02F 1/00* | (2006.01) |
| *C02F 1/42* | (2006.01) |
| *C02F 1/50* | (2006.01) |
| *B01D 15/08* | (2006.01) |
| *B01D 35/14* | (2006.01) |
| *B01D 15/00* | (2006.01) |
| *B01J 20/00* | (2006.01) |
| *B01J 39/00* | (2006.01) |
| *B01J 49/00* | (2017.01) |

(52) U.S. Cl.
CPC ............ *B01D 35/143* (2013.01); *B01D 15/08* (2013.01); *C02F 1/003* (2013.01); *C02F 1/281* (2013.01); *C02F 1/283* (2013.01); *C02F 1/42* (2013.01); *C02F 1/505* (2013.01); *B01D 2201/56* (2013.01); *C02F 2307/06* (2013.01)

(58) Field of Classification Search
CPC ......... A61M 1/16; B01D 15/00; B01D 15/04; B01D 15/08; B01D 35/00; B01D 35/14; B01D 35/143; B01D 2201/56; B01J 20/00; B01J 39/00; B01J 49/00
USPC .......................................................... 210/87
See application file for complete search history.

(56) References Cited

U.S. PATENT DOCUMENTS

| | | | | |
|---|---|---|---|---|
| 2005/0098485 A1* | 5/2005 | Boyd | ..................... | B01D 35/04 210/87 |
| 2008/0078710 A1* | 4/2008 | Larkner | .................. | C02F 1/008 210/109 |

(Continued)

FOREIGN PATENT DOCUMENTS

WO   WO-0194893 A1 * 12/2001 ........... B01D 29/603

*Primary Examiner* — Hayden Brewster
(74) *Attorney, Agent, or Firm* — Joseph E. Maenner; Maenner & Associates, LLC

(57) ABSTRACT

A water filter assembly is provided. The assembly includes an outer shell and a filter disposed inside the outer shell. The filter has an upstream portion constructed from a first media and a downstream portion constructed from a second media. A fluid flow meter is located downstream of the filter. An electronic processor is electronically connected to the fluid flow meter and is adapted to transmit a wireless signal to a remote electronic device to display flow information from the fluid flow meter.

19 Claims, 7 Drawing Sheets

(56) References Cited

U.S. PATENT DOCUMENTS

2011/0186154 A1* 8/2011 Klicpera .................. B67D 7/08
  137/551
2011/0303543 A1* 12/2011 Fritze ..................... B01D 35/06
  204/554

* cited by examiner

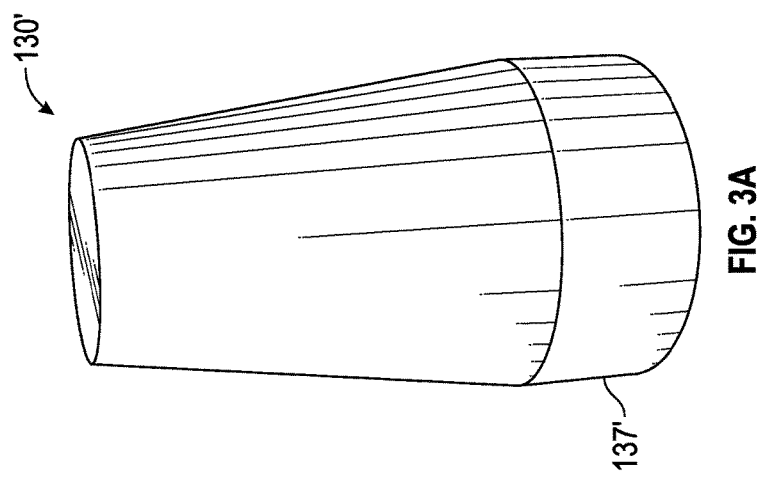
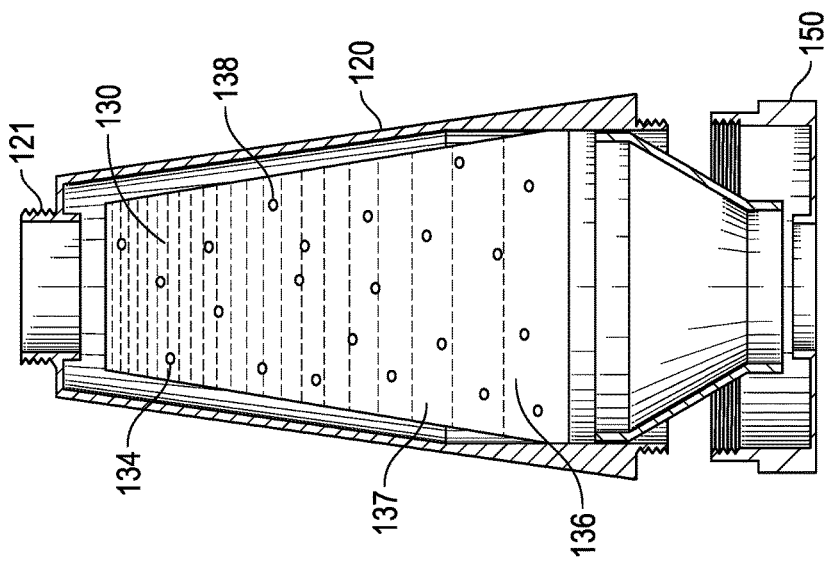

ELECTRONIC WATER FILTER ASSEMBLY WITH FAUCET CONNECTORS AND DISSIMILAR, UPSTREAM FRUSTO-CONICAL, DOWNSTREAM TUBULAR-SHAPED, MEDIA

CROSS-REFERENCE TO RELATED APPLICATION

The present application claims priority from U.S. Provisional Patent Application Ser. No. 62/273,476, filed Dec. 31, 2015, the contents of which are incorporated herein by reference in their entirety.

BACKGROUND OF THE INVENTION

Water filters are often used to filter tap water from a faucet prior to its ultimate discharge. These filters, however, typically do nothing more than just filter some contaminants from the water from the faucet.

It would be beneficial to provide a water filter that not only filters water, but provides additional information to a user such as the amount of water use, when the filter needs to be replaced, as well as parameters about the quality of the water flowing through the filter.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, the present invention provides a water filter assembly. The assembly includes an outer shell and a filter disposed inside the outer shell. The filter has an upstream portion constructed from a first media and a downstream portion constructed from a second media. A fluid flow meter is located downstream of the filter. An electronic processor is electronically connected to the fluid flow meter and is adapted to transmit a wireless signal to a remote electronic device to display flow information from the fluid flow meter.

The present invention also provides a fluid filter assembly comprising a plurality of faucet connectors, an outer housing having an upstream end removably connectable to each of the plurality of faucet connectors, and a filter disposed in the outer housing. The filter has a generally frusto-conically shaped upstream portion and a generally cylindrical downstream portion. A fluid flow meter is located downstream of the filter. The fluid flow meter comprises a turbine having a plurality of blades and a magnetic material fixed to one of the turbine blades and a magnetic sensor located proximate to the turbine and adapted to sense the magnetic material and transmit and electronic signal. An electronic processor is electronically coupled to the magnetic sensor to receive the electronic signal and to transmit a wireless signal to a remote device.

BRIEF DESCRIPTION OF THE DRAWINGS

Inventive aspects, features, and advantages of the present invention will become more fully apparent from the following detailed description, the appended claims, and the accompanying drawings in which like reference numerals identify similar or identical elements.

FIG. 3 is a sectional view of the assembly shown in FIG. 1;

FIG. 3A is a side elevational view of an alternative embodiment of a filter for use with the filter assembly of FIG. 1;

DETAILED DESCRIPTION

Figure 1:
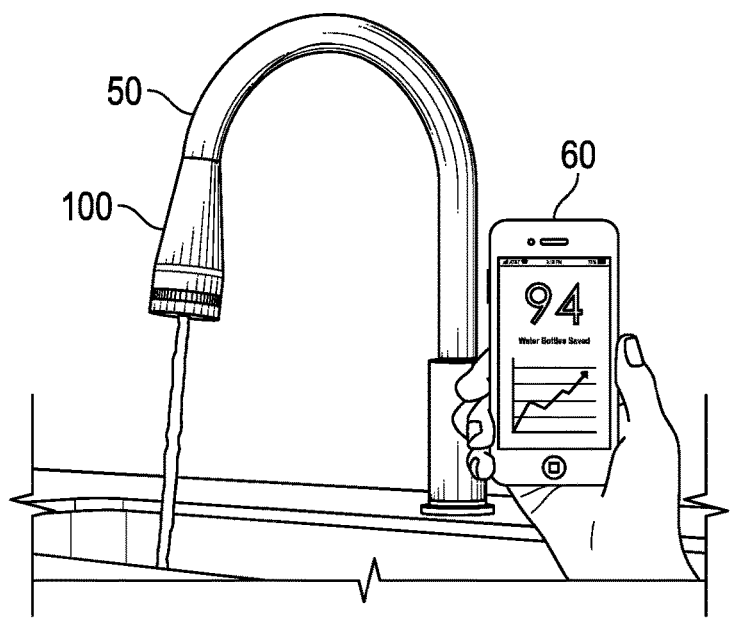
FIG. 1 is a perspective view of a water filter assembly according to a first exemplary embodiment of the present invention attached to a water faucet.

In the drawings, like numerals indicate like elements throughout. Certain terminology is used herein for convenience only and is not to be taken as a limitation on the present invention. The terminology includes the words specifically mentioned, derivatives thereof and words of similar import. As used herein, the term "upstream" is a direction closer to the source of water for the inventive filter, and the term "downstream" as a direction farther from the source of water for the inventive filter. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of non-transient program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of non-transient program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The present invention provides a water filter that not only filters water, but also provides information about the water being filtered. The inventive water filter, in addition to filter media, also includes electronic sensors that are used to determine the quality of the water after filtering, and comparing the results to annual EPA water quality reports for a particular region, as well as electronic wireless technology that provides for communication between the inventive filter, and a remote electronic processor.

Referring now to FIG. 1, a water filter assembly 100 ("assembly 100") according to a first exemplary embodiment of the present invention is shown. Assembly 100 can be releasably attached to a faucet 50, such as, for example, a household kitchen faucet. Assembly 100 includes wireless communication capability with a remote electronic device 60, such as, for example, a cell phone, electronic tablet, or other such electronic device.

Assembly 100 provides users with water purification information about their water system. Such information can include how efficiently a user uses the water, as well as the contents of the water. Assembly 100 tracks water usage and provides an indication to inform a user when to replace a filter within assembly 100.

Figure 2:
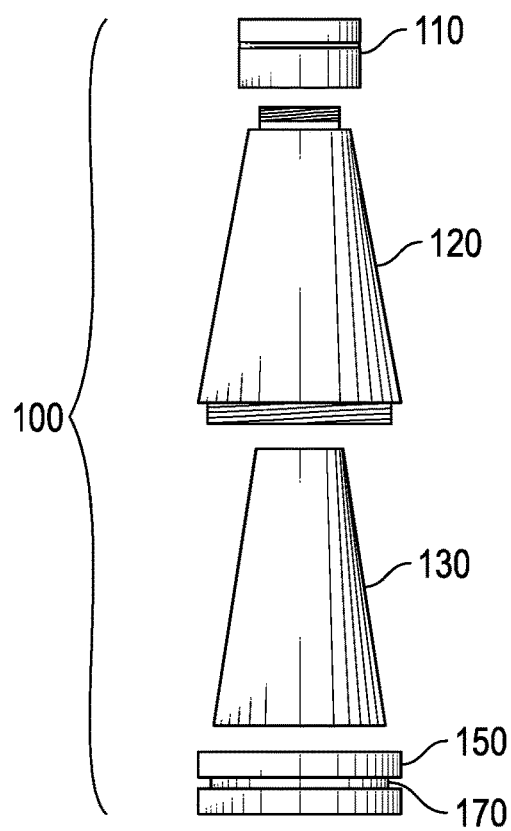
FIG. 2 is exploded view of the assembly shown in FIG. 1.

FIG. 2 shows exploded view of assembly 100, while FIG. 3 shows a sectional view of assembly 100. Assembly 100 includes a connection piece 110 that connects assembly 100 to faucet 50 via an internal threaded fitting 112. Optionally, a plurality of different connection pieces can be provided to increase compatibility of assembly 100 with a majority of commercially available faucet.

A filter housing 120 is located downstream of connection piece 110. In an exemplary embodiment, filter housing 120 includes a threaded connection 121 (shown in FIG. 3) to mate with a compatible threaded connection on connection piece 110. Such threaded connection allows filter housing 120 to be removed from connection piece 110 without having to remove connection piece 110 from faucet 50 for replacement of components within filter housing 120.

A filter system 130 is located within filter housing 120, and is used to filter water flowing through assembly 100. Filter system 130 includes a micro filter 132 that is located at the upstream end of filter system 130. Micro filter 132 is used to limit larger sized particles from entering the remainder of filter system 130. Filter system 130 also includes zeolites 134 that can be varied in type and amount according to known or expected contaminants in water in a particular geographic area, a copper and zinc impregnated filter media 136, such as, for example, KDF® process media, which is an ion exchanger and is used to extend the life of activated carbon 137 in filter system 130, and silver and/or gold embedded elements 138 that are used to treat water contaminated with living organisms, such as, for example, bacteria. Zeolites 134, copper and zinc impregnated filter media 136, and silver and/or gold embedded elements 138 are embedded in carbon 137, which makes up the bulk of filter system 130.

Filter system 130 can be tailored for different regions of the world such that filter system 130 is directed to removing particular contaminants found in the water of those regions. For example, in regions with higher levels of contamination due to bacteria, filter system 130 can contain filters, such as the silver and/or gold embedded filter layers 138, that focus on removing this type of contamination, whereas, for regions with higher contamination levels due to chemicals such as chlorine or fluoride, activated carbon 137 is required in filter system 130.

An alternative filter system 130' for use with filter housing 120 is shown in FIG. 3A. Filter system 130' is similar to filter system 130 described and discussed above. However, with the addition of a solid block of carbon 137' at the distal end thereof to remove contaminations with small particle sizes. Block of carbon 137' operates similarly to the granulated activated carbon 137 in filter system 130, but with smaller pore sizes to allow for the adsorption of even smaller sized particles.

An electric hub assembly 150 is located downstream of filter housing 120 and is releasably attached to filter housing 120, such as, for example, via a threaded connection Hub assembly 150 includes an ultraviolet light emitting diode (LED) 151 that purifies the water as the water flows through assembly 100. The ultraviolet wavelength kills almost all microorganisms in the water.

Figure 4:
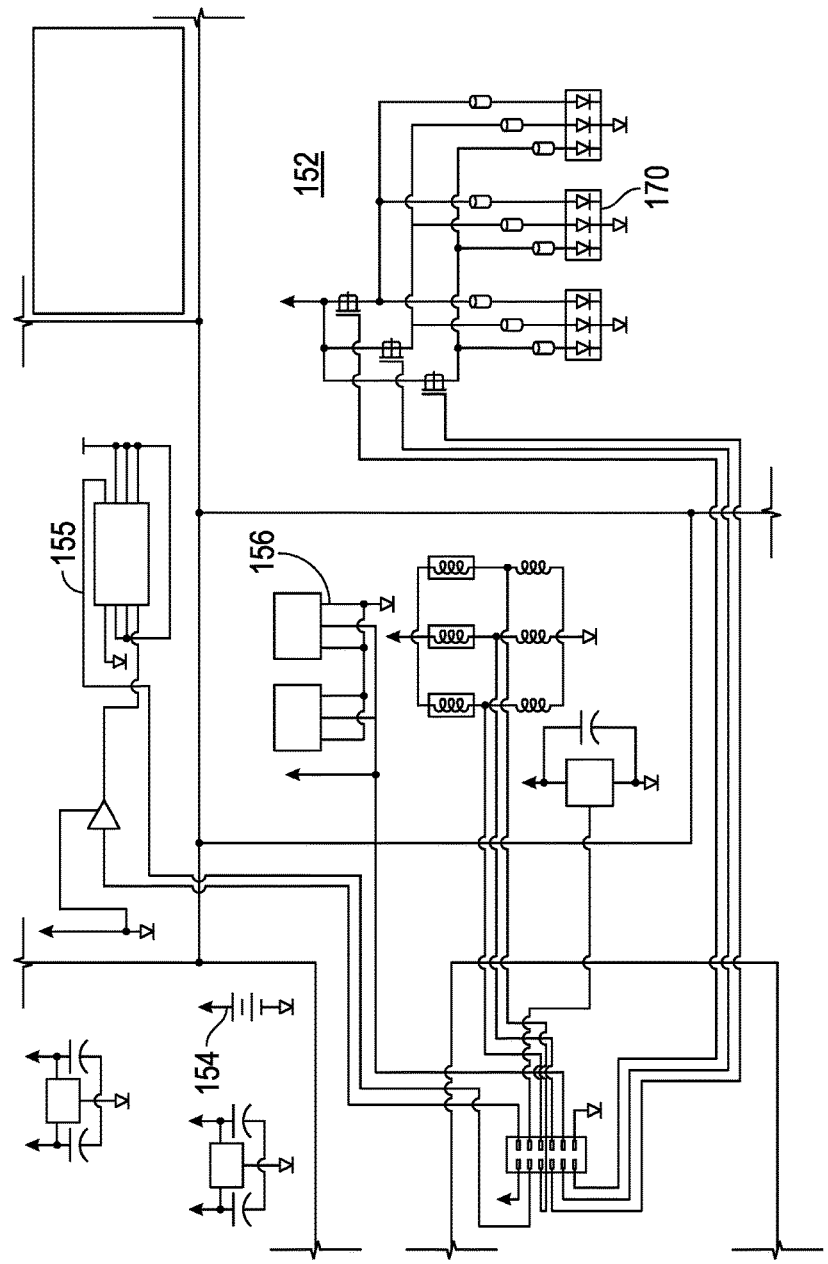
FIG. 4 is a schematic view of an exemplary electronic assembly for the water filter assembly shown in FIG. 1.

Hub assembly 150 includes an electronic control board 152 that processes information received from assembly 100 and communicates wirelessly via a wireless transmitter 155 with remote electronic device 60. Remote electronic device 60 is provided with a computer application ("app") that can be used to communicate with hub assembly 150 to transmit information between remote electronic device 60, and hub assembly 150. By way of example only, assembly 150 may be Blue Tooth compatible with remote electronic device 60. A schematic drawing of an exemplary electronic system provided on electronic control board 152 is shown in FIG. 4. Exemplary information that can be transmitted and displayed on remote electronic device 60 are total flow through assembly 100, flow rate through assembly 100, approximate remaining life of a filter and/or battery used with assembly 100, the number of water bottles "saved" by using assembly 100 instead of purchasing bottled water, as well as other parameters.

Electronic control board 152 includes a processor 153 that is powered by a power source 154, such as, for example, a lithium-ion battery, located in hub assembly 150. Optionally, although not shown, a micro turbine located within assembly 100, such as, for example, at an upstream end of filter housing 120, can be used to maintain electrical charge for power source 154.

Optionally, hub assembly 150 can include a temperature sensor 156, a pH sensor 158, a total dissolved solids sensor 160 (not shown). In an exemplary embodiment, hub assembly 150 also optionally includes an accelerometer (not shown) that ensures that assembly 100 is properly connected to faucet 50 and that provides an accurate determination of the flow rate of water through assembly 100, a gyroscope (not shown) that is used to generate more accurate readings from the sensors on control board 152, and a TSS (Total Suspended Solids) sensor (not shown) that measures total suspended solids within the water and allows the user via remote electronic device 60 better understand the contaminants within the water.

Hub assembly 150 also includes an LED band 170 (shown in FIG. 2) that emits a first color, such as, for example, cyan, when assembly 100 is properly working and the water flowing through assembly 100 is being properly filtered and emits a second color, such as, for example, red, when assembly 100 detects a problem either with assembly 100 or with the water flowing through assembly 100.

In operation, as water flows from faucet 50, through assembly 100. Water first flows through micro filter 132 and then through the remainder of filter system 130, passing through carbon 137, zeolites 134, copper and zinc impregnated filter media 136, and silver and/or gold embedded elements 138. The water then flows through hub assembly 140, where sensors 156, 158, 160 measure respective parameters of the water and transmit electronic signals to processor 153. Processor 153 in turn wirelessly transmits the sensed information via wireless transmitter 155 to remote electronic device 60. Remote electronic device 60 can display information to the user about the quality of the water flowing through assembly 100 as well as to wirelessly transmit such information to another remote location, such as, for example, a service center (not shown).

The information provided by processor 153 can inform the user about the status of both the water flowing through filter assembly 100, filter assembly 100 itself, and also, whether any elements of filter system 130 need to be replaced or may soon need to be replaced. Further, such information provided to the service center can prompt the service center to ship any required replacement parts to the user without the user requesting such shipment. Additionally, the replacement parts can be shipped to the user prior to filter assembly 100 requiring the replacement parts so that the user will have the replacement parts available when they are needed.

In addition to transmitting information about the status of assembly 100, processor 153 can transmit information to a remote electronic device 60, and the service center regarding the water quality both upstream and downstream of filter system 130, usage rates, reuse, storage, and the user's carbon footprint.

Figure 5:
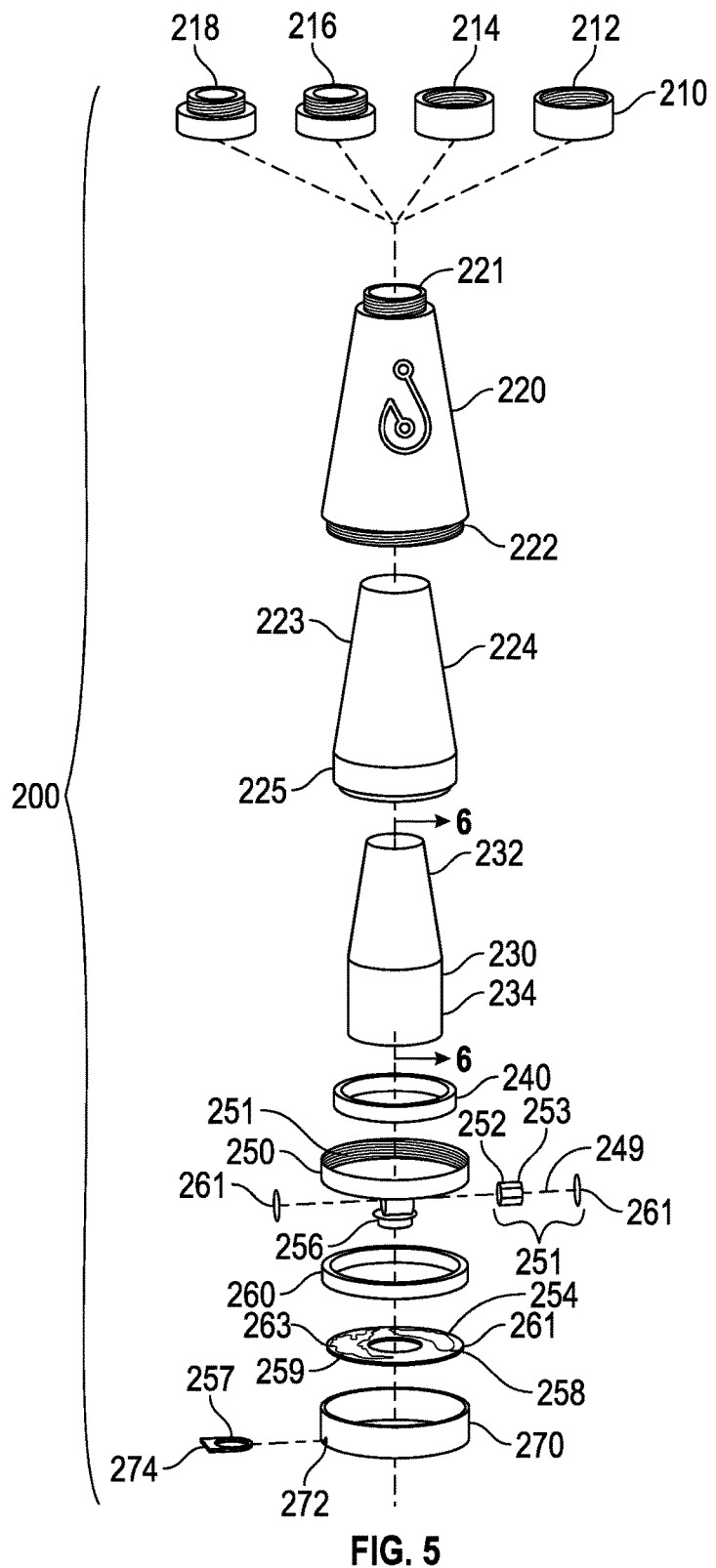
FIG. 5 is an exploded view of a water filter assembly according to an alternative exemplary embodiment of the present invention.
Figure 5A:
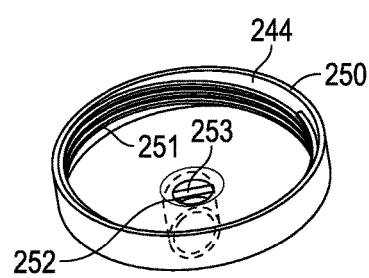
FIG. 5A is a perspective view of a hub assembly with water turbine used with the water filter assembly shown in FIG. 5.
Figure 5B:
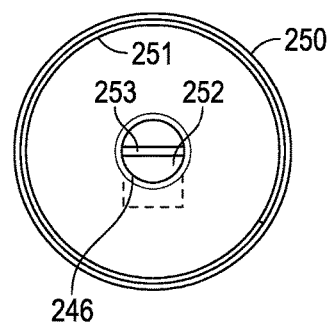
FIG. 5B is a top plan view of the hub assembly with water turbine shown in FIG. 5A.
Figure 5C:
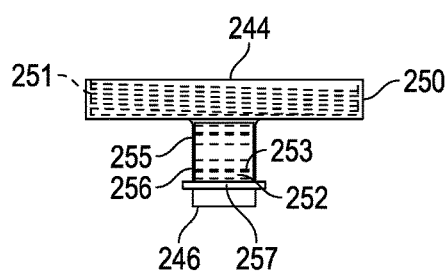
FIG. 5C is a left side elevational view of the hub assembly with water turbine shown in FIG. 5A.
Figure 5D:
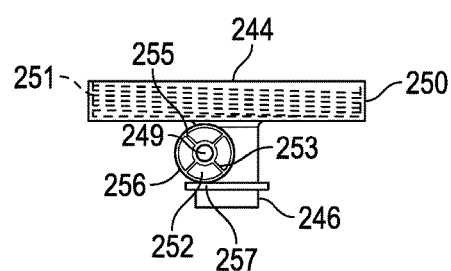
FIG. 5D is a front elevational view of the hub assembly with water turbine shown in FIG. 5A.
Figure 6:
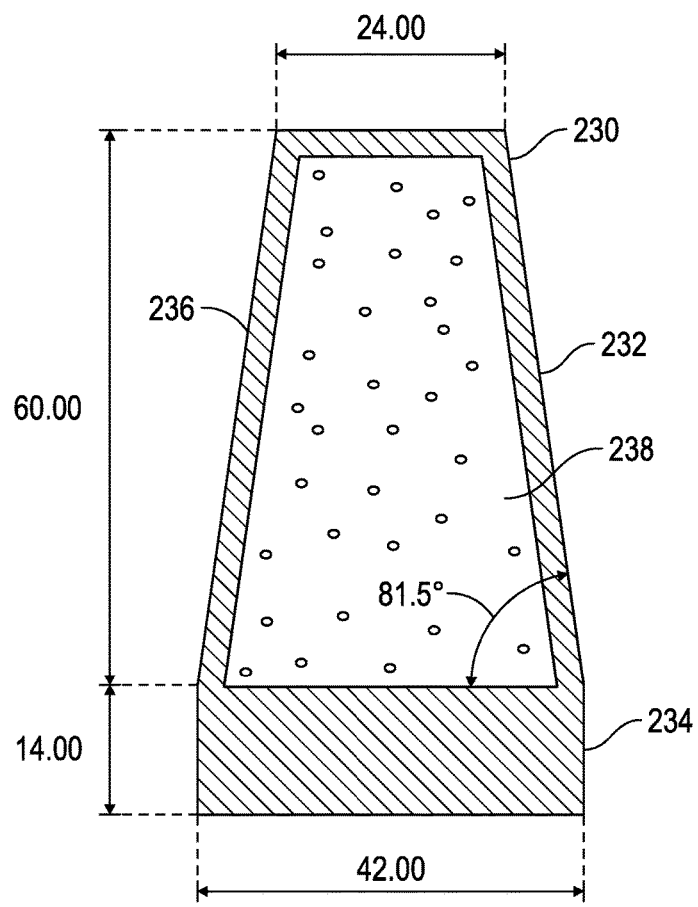
FIG. 6 is a sectional view of an exemplary filter taken along lines 6-6 of FIG. 5.
Figure 7:
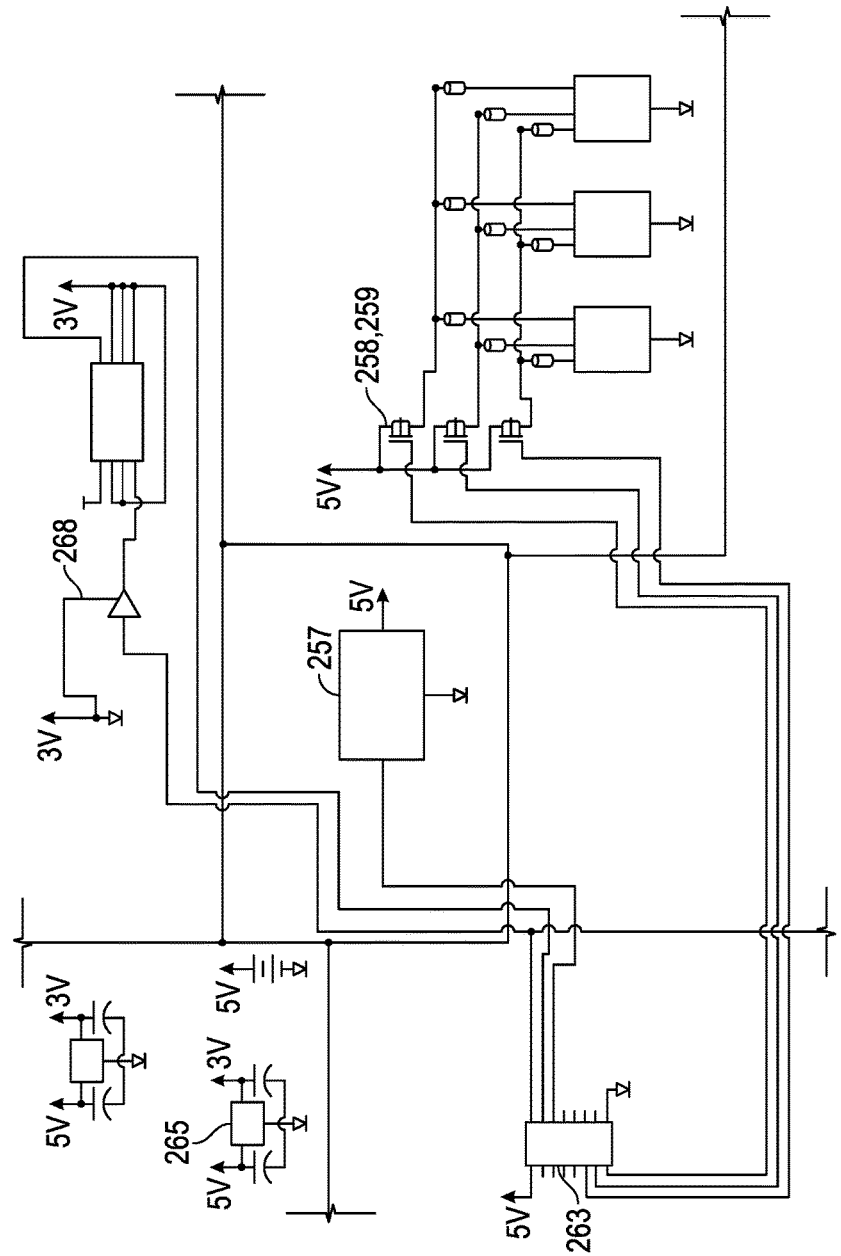
FIG. 7 is a schematic view of an exemplary electronic assembly for the water filter assembly shown in FIG. 5.

An alternative water filter assembly 200 ("assembly 200") according to the present invention is shown in FIGS. 5-7. Assembly 200 is similar to assembly 100 discussed above, with several different features.

Assembly 200 includes a connection piece 210 that connects assembly 200 to faucet 50 via an internal threaded fitting 212. Optionally, a plurality of different connection pieces 214, 216, 218 can be provided to increase compatibility of assembly 100 with a majority of commercially available faucets.

An outer filter housing 220 is located downstream of connection piece 210. In an exemplary embodiment, outer filter housing 220 includes an upstream threaded connection 221 to mate with a compatible threaded connection on connection piece 210. Such threaded connection 221 allows outer filter housing 220 to be removed from connection piece 210 without having to remove connection piece 210 from faucet 50 for replacement of components within filter housing 220. In an exemplary embodiment, connection pieces 210, 214, 216, 218, and outer filter housing 220 can be constructed from stainless steel or other suitable material.

Outer filter housing 220 also includes a downstream threaded connection 222 that allows for removable connection to a hub assembly 250. An inner filter housing 224 that slidably fits inside outer filter housing 220. An upstream end 223 of inner filter housing 224 is generally frusto-conically shaped and a downstream end 225 of inner filter housing 224 is generally tubularly shaped.

A filter system 230 is located within inner filter housing 224, and is used to filter water flowing through assembly 200. Filter system 230 has a generally frusto-conically shaped upstream portion 232 and a generally cylindrically shaped downstream portion 234. Generally, materials with larger pore sizes will be located toward an upstream end of filter assembly 230, and materials with smaller pore sizes, such as ultrafiltration membranes and carbon blocks will be located toward a downstream end of filter system 230. In an exemplary embodiment, upstream portion 232 can be a solid carbon block, while downstream portion 234 can be granulated carbon with KDF process media.

Referring to FIG. 6, upstream portion 232 has an outer covering 236 constructed from a solid carbon block and an inner portion 238 constructed from granulated carbon particles. Exemplary dimensions for filter system 230 are shown in FIG. 6 (in millimeters).

Similar to filter system 130 discussed above, filter system 230 can be tailored for different regions of the world such that filter system 230 is directed to removing particulate contaminants found in the water of those regions. For example, in regions with higher levels of contamination due to bacteria, filter system 230 can contain filters, such as silver and/or gold embedded filter layers that focus on removing this type of contamination, whereas, for regions with higher contamination levels due to chemicals such as chlorine or fluoride, activated carbon is required in filter system 230.

Referring back to FIG. 5, a filter cap 240 retainer filter system 230 within inner filter housing 224. In an exemplary embodiment, filter cap 240 engages inner filter housing 224 in an interference fit, although those skilled in the art will recognize that other connections, such as a snap-fit, a screw connection, or other suitable connection can be made.

Hub assembly 250 is located downstream of outer filter housing 220 and is releasably attached to outer filter housing 220, such as, for example, via a threaded connection 251. Hub assembly 250 includes a wider upstream end 244 that necks down to a significantly narrower downstream opening 246. Hub assembly 250 acts as a funnel and imparts a back pressure on fluid upstream in filter assembly 230 to enhance filtration of the fluid.

Hub assembly 250 includes a fluid flow meter in the form of a turbine assembly in downstream opening 246 that can measure and record flow rates and volumes through assembly 200. While a turbine assembly is used, those skilled in the art will recognize that other types of flow meters may be used.

The turbine assembly includes a rotary turbine 252 having a plurality of blades 253 extending radially outwardly therefrom. Turbine 252 is mounted on a shaft 249, which is in turn mounted on a shaft support 256 on a downstream end of hub assembly 250.

FIGS. 5A-5D provide a more detailed view of hub assembly 250 and turbine 252. One of blades 253 includes a magnetized material 255. A magnetic sensor 257 is located proximate to turbine 252, such as, for example, at downstream opening 246. Sensor 257 is electronically connected to a processor on a control board 254 inside assembly 200.

As fluid flows through downstream opening 246, the fluid impinges on turbine blades 253, rotating turbine 252 on shaft 249. Each time magnetized material 255 rotates past magnetic sensor 257, the magnetic field around sensor 257 changes, resulting in a change of electrical current that is transmitted to an electronic processor 263 located on control board 254. Each change in electrical current indicates a full rotation of turbine 252. A flow of fluid past turbine 252 (and thus through assembly 200) can be calculated by determining the area of downstream opening 246, the number of rotations of turbine 252, and the amount of time that turbine 252 spins (indicating the amount of time that fluid flows through assembly 200). Time is calculated by an internal electronic clock in Turbine caps 261 are located on either end of shaft 249 and seal turbine so that fluid flowing past turbine 252 does not leak out of assembly 200.

An annular translucent or transparent ring 260 is located downstream of hub assembly 250. As discussed above, electronic control board 254 includes a processor that processes information received from assembly 200 and communicates wirelessly with remote electronic device 60 is located downstream of ring 260. Remote electronic device 60 is provided with a computer application ("app") that can be used to communicate with control board 254 via a wireless transmitter 268 on control board 254 to transmit information between remote electronic device 60 and control board 254. By way of example only, assembly 200 may be Bluetooth compatible with remote electronic device 60. A schematic drawing of an exemplary electronic system provided on electronic control board 254 is shown in FIG. 7.

Electronic control board 254 includes a processor 263 that is powered by a power source 265, such as, for example, a lithium-ion battery, located in a base shell 270. Control board 254 also includes indicating indicia, such as LED lights 258, 259 that emit a first color, such as, for example, cyan, when assembly 200 is properly working and the fluid flowing through assembly 200 is being properly filtered and emits a second color, such as, for example, red, when assembly 200 needs attention or detects a problem either with assembly 200 or with the fluid flowing through assembly 200.

Optionally, control board 254 can include a pH sensor, a TSS sensor, and/or a temperature sensor, depending on the intended environment in which assembly 200 will be used.

Base shell 270 includes a slot 272 for battery 265. Battery 265 is disposed in a battery case 274 that is removably inserted into slot 272.

The information provided by control board 254 can inform the user about the status of both the water flowing through filter assembly 200, filter assembly 200 itself, and also, whether any elements of filter system 230 need to be replaced or may soon need to be replaced. Further, such information provided to the service center can prompt the service center to ship any required replacement parts to the user without the user requesting such shipment. Additionally, the replacement parts can be shipped to the user prior to filter assembly 200 requiring the replacement parts so that the user will have the replacement parts available when they are needed.

In addition to transmitting information about the status of assembly 200, control board 254 can transmit information to a remote electronic device 60, and the service center regarding the water quality both upstream and downstream of filter system 230, usage rates, reuse, storage, and the user's carbon footprint.

It will be further understood that various changes in the details, materials, and arrangements of the parts which have been described and illustrated in order to explain the nature of this invention may be made by those skilled in the art without departing from the scope of the invention as expressed in the following claims.

We claim:

1. An electronic water filter assembly for removable connection to a water faucet, the assembly comprising:
    a plurality of faucet connectors adapted to be connected to a water faucet;
    an outer shell having an upstream end removably connectable to each of the plurality of faucet connectors;
    a filter disposed inside the outer shell, the filter comprising a generally frusto-conically shaped upstream portion constructed from a first media and a generally cylindrical downstream portion constructed from a second media, different from the first media;
    at least two sensors located downstream of the filter, the at least two sensors comprising at least two of:
        a fluid flow meter;
        a temperature sensor;
        a total suspended solids ("TSS") sensor; and
        a pH sensor;
    an electronic processor electronically connected to each of the at least two sensors; and
    a transmitter electronically connected to each of the at least two sensors and adapted to transmit a wireless signal to a remote electronic device to display information from each of the at least two sensors.

2. The electronic water filter assembly according to claim 1, wherein the first media comprises a carbon block.

3. The electronic water filter assembly according to claim 1, wherein the second media can be varied in type and amount according to known or suspected contaminants in water in a particular geographic area.

4. The electronic water filter assembly according to claim 1, further comprising an inner housing disposed between the outer shell and the filter.

5. The electronic water filter assembly according to claim 1, wherein the fluid flow meter comprises a water turbine.

6. The electronic water filter according to claim 1, wherein the water turbine comprises a magnetized member and wherein the fluid flow meter further comprises a magnetic sensor.

7. The electronic water filter assembly according to claim 1, further comprising a first indicating indicia electronically connected to the electronic processor such that the first indicating indicia indicates when the filter assembly needs attention.

8. The electronic water filter assembly according to claim 7, further comprising a second indicating indicia electronically connected to the electronic processor such that the second indicating indicia indicates when the filter assembly is in proper working condition.

9. The electronic water filter assembly according to claim 1, wherein the upstream portion has a generally frusto-conical shape.

10. The fluid filter assembly according to claim 1, further comprising an electrical power source electrically coupled to the electronic processor.

11. The fluid filter assembly according to claim 10, further comprising a first indicating indicia electronically connected to the electronic processor such that the first indicating indicia indicates when the filter assembly needs attention and a second indicating indicia electronically connected to the electronic processor such that the second indicating indicia indicates when the filter assembly is in proper working condition.

12. The fluid filter assembly according to claim 11, wherein the first indicating indicia comprises a light having a first color and the second indicating indicia comprises a light having a second color.

13. The fluid filter assembly according to claim 11, further comprising one of a transparent band and a translucent band disposed around the first and second indicating indicia.

14. The fluid filter assembly according to claim 13, wherein the one of the transparent band and the translucent band is located downstream of the filter.

15. The fluid filter assembly according to claim 14, further comprising an inner filter housing located between the outer hosing and the filter.

16. The fluid filter assembly according to claim 15, wherein the inner filter housing has a generally frusto-conically shaped upstream end and a generally tubularly shaped downstream end.

17. The fluid filter assembly according to claim 15, further comprising a filter cap disposed downstream of the filter and adapted to engage the inner filter housing.

18. The fluid filter assembly according to claim 1, wherein the downstream portion of the filter comprises at least two of zeolites, copper, zinc, silver and gold.

19. The fluid filter assembly according to claim 18, wherein the downstream portion of the filter further comprises granulated carbon.

* * * * *